United States Patent [19]

Gazes et al.

[11] Patent Number: 4,920,757
[45] Date of Patent: May 1, 1990

[54] GEOTHERMAL HEATING AND AIR CONDITIONING SYSTEM

[76] Inventors: Jimmy Gazes, 803 O'Sullivan Dr., Mt. Pleasant, S.C. 29464; Dewey Mixson, 1117 Dickson Ave., Hanahan, S.C. 29406

[21] Appl. No.: 395,262

[22] Filed: Aug. 17, 1989

Related U.S. Application Data

[63] Continuation-in-part of Ser. No. 233,418, Aug. 18, 1988.

[51] Int. Cl.⁵ ............................................. F25D 23/12
[52] U.S. Cl. ........................................ 62/181; 62/197; 62/260; 62/324.1
[58] Field of Search ............... 62/260, 324.1, 509, 62/181, 507, 197

[56] References Cited

U.S. PATENT DOCUMENTS

| | | |
|---|---|---|
| 2,244,312 | 6/1941 | Newton ............................ 62/181 |
| 2,363,273 | 11/1944 | Waterfill ........................... 62/197 |
| 2,503,456 | 4/1950 | Smith ................................ 62/260 |
| 2,529,154 | 11/1950 | Hammond et al. ............... 62/260 X |
| 2,885,868 | 5/1959 | Radcliffe .......................... 62/509 X |
| 2,897,659 | 8/1959 | Wergner ........................... 62/509 |
| 3,201,950 | 8/1965 | Shrader ............................. 62/197 |
| 3,350,859 | 11/1967 | Harnish ............................ 62/503 X |
| 4,236,381 | 12/1980 | Imral et al. ...................... 62/324.1 |
| 4,373,346 | 2/1983 | Hebert et al. .................... 62/324.1 X |
| 4,694,662 | 9/1987 | Adams .............................. 62/509 |

Primary Examiner—William E. Tapoical
Attorney, Agent, or Firm—B. Craig Killough

[57] ABSTRACT

A geothermal heating and air conditioning system having heat exchange coils located vertically in the ground is provided with a condenser receiver and a metering system which allows a relatively large amount of refrigerant to be used within the system for maximum efficiency without the problems of liquid refrigerant buildup which have been previously associated with geothermal systems using vertical coils.

4 Claims, 2 Drawing Sheets

GEOTHERMAL HEATING AND AIR CONDITIONING SYSTEM

This is a continuation-in-part of application Ser. No. 233,418 filed Aug. 18, 1988, pending.

BACKGROUND AND SUMMARY OF THE INVENTION

This invention relates generally to heating and/or air conditioning systems, and is specifically directed to a heating and air conditioning system in which heat exchange is accomplished through the use of geothermal ground coils which are vertically inserted into the ground.

In air conditioning systems commonly is use, and in heat pump systems in particular, heat exchange between a refrigerant contained within the system and the environment is required. Most commonly, this heat exchange has been accomplished by means of ambient air, wherein the refrigerant is directed to an outdoor coil and heat exchange between the refrigerant contained within the coils is made with the outside air.

The problem associated with heat exchange with outside air is the inconsistency of the temperature of the outside air. Particularly with heat pumps, since heat for the heating cycle is obtained from the outside air, the system loses its efficacy and efficiency as the outside temperature drops, since there is less heat in the air which can be extracted for the purpose of indoor heating. This problem is compounded due to the fact that as the temperature drops, additional heat is needed to heat the building.

To overcome the problems associated with heat exchange with the outside air, water and geothermal means have been employed for heat exchange. In the water system, heat exchange within the refrigerant contained within the system is accomplished by exposing refrigerant contained within the coil to quantities of water, which is generally passed in a dynamic fashion across the coils. This system requires large quantities of water, and ground water is usually employed. Limitations in this system include the availability of ground water which can be efficiently and cost-effectively obtained in sufficient quantities to achieve the desired and required heat exchange.

It has previously been recognized that geothermal heat exchange is potentially an efficient and effective way of achieving heat exchange in heating and air conditioning systems, and especially heat pump type systems. Since the ground temperature is relatively constant at about 68 degrees F. at a depth below the frost line, the available heat is constant. However, a problem which has been associated with such systems is the means and manner in which the heat exchange coils, or outdoor coils, are placed into the ground to achieve geothermal heat exchange.

It is preferred to place the geothermal outdoor coils into the ground in a vertical fashion. Installation may be easily accomplished by drilling or boring holes into the ground, into which the vertical geothermal outdoor coils may be placed. The coils may quickly and easily be placed into the ground to a depth with is sufficient to overcome ground freezing problems associated with colder climates.

Heretofore, the reason that placing coils into the ground in a vertical fashion has not been workable is due to the fact that when sufficient refrigerant is placed into the system to achieve maximum efficiency on both the heating and cooling cycles, the refrigerant as it condenses in the ground coils, causes a liquid refrigerant build-up. The compressor is unable to properly move the refrigerant through the system when the liquid refrigerant settles within the ground coils, making the system unworkable. Damage to the compressor can occur when the compressor forces liquid refrigerant into the intake of the compressor, since compressors for such systems ar designed for receiving and compressing gases.

In the prior art, to overcome the problem associated with vertical outdoor geothermal coils, the coils have been placed into the ground in a horizontal fashion. Placing the coils into the ground in a horizontal fashion alleviates the problem of liquid refrigerant build-up, since there is not a low point which the refrigerant seeks, but requires a vast amount of available ground to achieve the proper heat exchange, and requires the excavation of sufficient land to place enough ground coils to achieve sufficient heat exchange. In colder climates, this excavation must also be to a sufficient depth to place the coils for proper heat exchange. In short, placing the geothermal coils in a horizontal fashion is more difficult, expensive, and requires much more available ground than does placing of the coils into vertical holes.

SUMMARY OF THE PRESENT INVENTION

The present invention incorporates a condenser/receiver placed between the indoor coil and the outdoor coil which acts as a receiver so as to regulate the quantity and state of the refrigerant within the system, and further incorporates a low amperage/high voltage fan used when the condenser/receiver acts as a condenser, to control and regulate the temperature of the refrigerant to prevent liquid refrigerant build-up within the ground coils, and to improve the efficiency of the system, as will be seen. The use of this condenser/receiver allows a large quantity of refrigerant to be used so as to achieve maximum efficiency and efficacy of the system for demonstrable power consumption savings, while alleviating the problems associated with the use of vertical geothermal ground coils as heretofore experienced.

DETAILED DESCRIPTION OF THE PREFERRED EMBODIMENT

Figure 1:
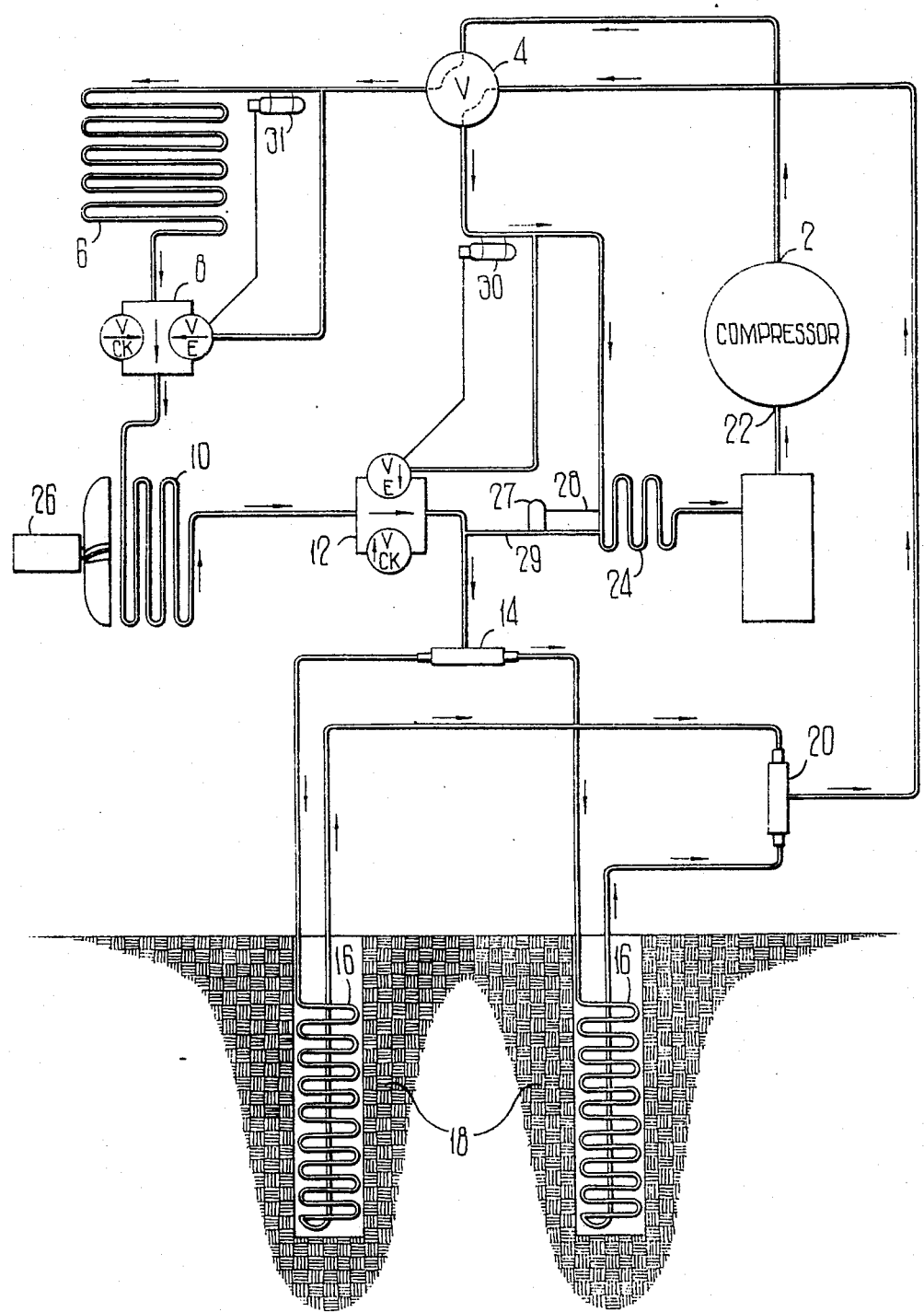
FIG. 1 is a schematic diagram of a reverse cycle heat pump system, with the arrows indicating the direction of travel of the refrigerant through the system in the heating cycle.

In the heating cycle—(FIG. 1), beginning at the discharge point 2 (high pressure side) of the compressor, gaseous refrigerant is sent under pressure through the change over valve 4 which directs the refrigerant in the gaseous state through the indoor coil 6 that dissipates the heat from the hot, gaseous refrigerant into the building. Heat is removed from the refrigerant as it passes through the indoor coil 6, with the pressure remaining constant, causing the refrigerant to change from the gaseous state into the liquid state. This liquid refrigerant leaves the indoor coil 6 and travels to manifold 8 that contains a check valve and an expansion valve. The check valve opens so as to allow the liquid refrigerant to enter the secondary condenser/receiver coil 10. From the condenser/receiver coil 10 the liquid refrigerant flows through manifold 12 which also has a check valve that is closed diverting the refrigerant through the expansion valve. This expansion valve meters the refrigerant through the distributor 14 that allows it to flow into the individual geothermal ground coils 16.

The cold refrigerant, as it passes into the ground coils 16, is able to attract and absorb heat from the surrounding earth 18. This causes some of the refrigerant in the liquid state to boil off into a gas, which now contains heat absorbed as it passes through the ground coil. Since this heat laden, but relatively cool, gas is light, it is easily pulled back to the compressor through a distributor 20, and travels to the change-over valve 4. This refrigerant in the gaseous state flows into the low side receiver accumulator 24 and back to the suction side 2 (low pressure) of the compressor.

This relatively cool, but heat laden, gas refrigerant is compressed by the compressor, raising the pressure of the gas, and accordingly raising the temperature so that the hot, gaseous refrigerant again travels from the discharge point 2 of the compressor through the reversing valve 4 and into the indoor coils 6 to heat the building in which the indoor coil is located.

The system operates in this manner until the desired temperature is reached, and the system is turned off by thermostatic control means known in the art.

Figure 2:
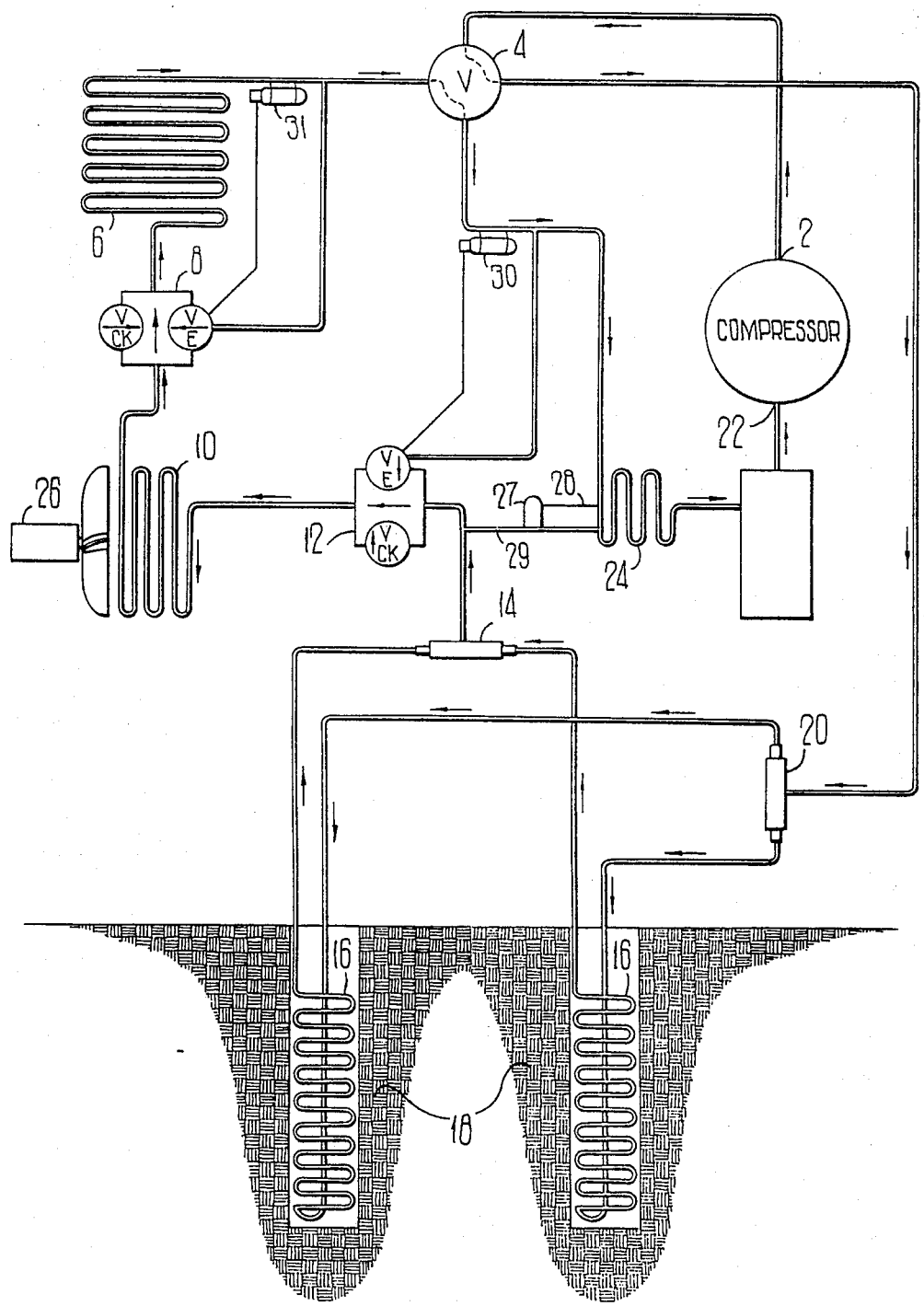
FIG. 2 is a schematic diagram of reverse cycle heat pump system, with the arrows indicating the direction of travel of the refrigerant with the system in the air conditioning mode.

The cooling cycle (FIG. 2.) is described beginning at the discharge point 2 (high pressure side) of the compressor. The hot, gaseous refrigerant as it is discharged from the compressor again enters the reversing valve 4, which has been reversed so as to direct the refrigerant through the system in a direction which is opposite to the direction for the heating cycle. In this cycle, the hot, gaseous refrigerant goes to the distributor 20 which directs the refrigerant into the vertical ground coils 16. The hot, gaseous refrigerant as it enters the ground coils 16 dissipates heat to the surrounding earth 18. The pressure remains the same, and accordingly, as the gas loses some of its heat, it changes state into a liquid.

The liquid refrigerant is forced out of the ground coils 16 through distributor 14 to manifold 12 which incorporates a check and an expansion valve. The check valve is open to the flow of the refrigerant in this direction, allowing the liquid refrigerant to flow into condenser/receiver 10. The liquid refrigerant leaves the receiver/condenser 10 and flows through manifold 8, but the check valve in manifold 8 will not open and allows the liquid refrigerant to be metered through expansion valve into indoor coil 6 which is now acting as an evaporator. This valve lowers the pressure of the refrigerant, which lowers the temperature of the refrigerant and sends it into evaporator where it comes in contact with the warm air stream that is circulating in the building. The cold liquid absorbs heat as it travels through the indoor coil, absorbing heat from the air, causing the refrigerant to boil off as a gas as it takes heat with it. The light, relatively cool (but heat laden) gas is easily pulled back through the change over or reversing valve 4. This valve 4 directs the refrigerant through the low side receiver accumulator 24 and back through the suction side 22 of the compressor.

Again, the relatively cool (but heat laden) refrigerant in the gaseous state enters the suction 22 (low side) of the compressor, where pressure of the refrigerant gas is increased and discharged as a hot gas from the discharge 2 (high side) of the compressor. This gas is again sent through the system as described above, until the temperature of the building reaches the desired level, whereupon the thermostatic means causes the system to discontinue operation.

On the heating cycle, the geothermal ground coil acts as an evaporator and it works on a flooded coil principle. The source of the heat extracted from the ground by the refrigerant as it passes through the geothermal ground coils may be latent or sensible, in the source of the heat is unimportant. However, the available heat for heat exchange renders the system more efficient and effective. Since the heating cycle will be used the winter time, there is obviously more heat available in the ground, which will maintain a relatively constant temperature below a certain depth depending on the climate, than in the air, whose heat content will vary greatly, and in fact, has less heat available at the time when the most heat is required.

On the cooling cycle, it is desirable to remove as much heat from the refrigerant as it is discharged from the compressor as possible. However, control of the amount of heat contained within the refrigerant at the various locations as the refrigerant travels through the system must be controlled. Accordingly, it is imperative that the evaporator coil on the cycle be controlled so as to pull sensible and latent heat in the right proportions in order to maintain proper and comfortable conditions. It is the condenser/receiver that enables the system to control the state and temperature of the refrigerant so as to cause the system to perform properly in both the heating and cooling cycles.

The present invention allows a large amount of refrigerant to be used on the cooling cycle, without having the refrigerant accumulate in the geothermal ground coils, which has been a problem associated with the use of vertical geothermal ground coils in the past. The use of the large amount of refrigerant is imperative for proper and efficient operation of the system on the heating cycle, and certainly improves the operation of the system on the cooling cycle so long as the state of refrigerant can be controlled properly so as to avoid the liquid refrigerant building up in the ground coils.

As indicated previously, the reason that geothermal heat pumps using vertical ground coils have not worked in the prior art is due to the accumulation of liquid refrigerant within the ground coils. Heretofore, no one has been able to control the refrigerant as it changes states through the system to make vertical ground coil system operable. Use of the proper quantity of refrigerant within the system and the state of the refrigerant as it travels through the system has presented problems in trying to use geothermal ground coils.

Even in conventional art, some means must be provided for elevating head pressure at the compressor to allow sufficient refrigerant to flow through the expansion valve and fill the evaporator with enough refrigerant to maintain proper suction pressure during cold or mild weather. Since neither an ambient air control, or hot gas by-pass valve may be applied to the present invention, an alternate means must be provided.

To overcome the problem of having insufficient refrigerant present on the suction side of the compressor when the device is used in the heating cycle, valve 27 controls refrigerant flow through line 29 which is provided to supply liquid refrigerant to the compressor as needed. Valve 27 opens and allows liquid refrigerant to be pulled through line 29 from the outlet of the ground coil between valve 12 and manifold 14 so as to increase the suction pressure at accumulator 24. Valve 27 is controlled by equalizing line 28 which indicates to the valve the amount of pressure which is present in accumulator 24.

As head pressure from the compressor increases due to liquid refrigerant being supplied through line 29, valve 27 closes. The head pressure from the compressor pushing the refrigerant through the inlet side and the suction of the compressor is pulling the refrigerant from the outlet of the ground coil.

By placing pressure on one side of the coil and reducing pressure on the other side, liquid refrigerant may leave the ground coil. This liquid refrigerant will flow through expansion valve 8, filing the evaporator and enabling the system to work properly on the cooling cycle.

At this point the evaporator is cold (35° to 40° F.), while an ambient ground temperature is approximately 68° F. Since the evaporator is now colder than the ground, the system will operate normally on the cooling cycle. Valve 27 is now seated and closed, allowing the system to operate at its full capacity.

The use of condenser/receiver 10 also allows what would be an excessive amount of refrigerant in the cooling cycle to be stored within the condenser/receiver 10 without creating a problem in the control of the evaporator in the cooling cycle or overloading the indoor condenser coil on the heating cycle.

The operation of this condenser/receiver 10 is improved by the use of a small fan 26 which is placed on the condenser/receiver and which is controlled thermostatically. In extremely hot weather, when the starting and cooling loads are heavy, the running time of the system tends to be longer. This fan 26 operates so as to cool the liquid refrigerant before it enters the evaporator 6, allowing the system to attain maximum refrigeration effect. This fan may be a relatively small fan, and in a typical installation may be a 1 ampere fan in a 220 volt system. The cooling effect on the refrigerant as it travels through the condenser/receiver 10, by cooling the refrigerant prior to the refrigerant entering the evaporator 6, draws only 1 amp, but will reduce power requirement of the system by 3 to 4 additional amperes. This increase in efficiency comes from the cooler liquid refrigerant containing less heat and pressure, resulting in fewer amperes being drawn by the compressor.

Example: A well known brand of heating and air conditioning system rated at 8.5 tons with a 30 kilowatt strip used for heating is compared with the geothermal system disclosed herein. In the example, the conventional unit is operating at a condensing temperature of 110 degrees F. liquid and an evaporator temperature of 40 degrees F. A geothermal pump can operate at 68 degrees F. condensing temperature (this being the ground temperature) and an evaporator temperature at 40 degrees F. In each system, R22 refrigerant is used.

The 110 degrees F. liquid refrigerant has 44.35 BTU's per pound, whereas 40 degree F. liquid refrigerant has 21.7 BTU's per pound, indicating that 22.65 BTU's per pound are needed to cool 1 pound of R22 refrigerant from 110 degrees F. to 4 degree F. evaporator temperature.

The latent heat of the R22 refrigerant at 40 degrees F. is 87.34 BTU's per pound. Reducing this by the 22.65 BTU's per pound needed to cool 1 pound of R22 refrigerant, results in a refrigeration effect per pound of 64.74 BTU's.

In the geothermal system disclosed here, the R22 liquid refrigerant at 68 F. has 30.35 BTU's per pound, and at 40 degrees F. has 21.70 BTU's per pound. The difference is 8.65 BTU's per pound, which is the number of BTU's needed to cool 1 pound of R22 refrigerant from 68 F. to 40 F. evaporator temperature.

Other refrigerant at 40 degrees F. is 87.39 BTU's per pound, which, when reduced by the 8.65 BTU's per pound gives a refrigeration effect of 78.74 BTU's per pound.

Accordingly, for this example, the refrigeration effect for the geothermal heat pump is in excess of 22% greater than for the conventional ambient heat exchange system.

For the conventional 8.5 ton air conditioning system used in the example, at 110 degrees F. condensing temperature, 48.5 amps are required for a 220 volt system. The power consumption is accordingly 10,670 watts. In the geothermal system disclosed herein, at 68 degrees F. condensing temperature, 42.5 amps are required in 220 volt system, for a power consumption of 9350 watts. Accordingly, the geothermal system disclosed herein will, for this example, use 14% less power than the conventional system. It should be remembered that while the unit is using less power, it is more efficient in its cooling while operating, meaning that the geothermal system will give even greater power savings since the unit will operate for less time to achieve the same cooling effect.

It is believed that for the example given above, that the overall power requirement for the geothermal system is 72% of that for the conventional system.

Further, on the heating cycle, in the example given, the conventional system uses 30,000 watts. The geothermal system, assuming the example above, would consume 9,350 watts. Based on this example, on the heating cycle, the present invention would use only 32% of the electrical power used in the conventional system during operation in the heat cycle.

What is claimed is:

1. A geothermal heating and air conditioning system, comprising:

a. a compressor means for compressing a refrigerant;
   b. one or more indoor coils for heat exchange between said refrigerant and inside air;
   c. one or more outdoor coils which are placed vertically below ground for heat exchange between said refrigerant and earth surrounding said outdoor coils;
   d. a condenser/receiver which allows the refrigerant to pass through said condenser/receiver in either direction, and which is positioned between said indoor coil and said ground coils, allowing for heat exchange so as to control the state and temperature of the refrigerant, and having sufficient volume capacity to accumulate liquid refrigerant to prevent liquid refrigerant from entering said compressor;
   e. a means for allowing a portion of said refrigerant traveling between said indoor coils and said outdoor coils to be diverted to an inlet side of said compressor; and f. a valve which controls a flow of refrigerant through said means in response to refrigerant pressure on said inlet side of said compressor.

2. A geothermal heating and air condition system as described in claim 1, further comprising a thermostatically controlled fan which cools said refrigerant as it passes through said condenser/receiver so as to control the state and temperature of said refrigerant.

3. A geothermal heating and air conditioning system, comprising:
   a. a compressor means for compressing a refrigerant;
   b. one or more indoor coils for heat exchange between said refrigerant and inside air;
   c. one or more outdoor coils which are placed vertically below ground for heat exchange between said refrigerant and earth surrounding said outdoor coils;
   d. a reversing valve which controls the direction of flow of said refrigerant as it leaves said compressor so as to direct said refrigerant initially to said ground coil or to said indoor coils;
   e. a condenser/receiver which allows the refrigerant to pass through said condenser/receiver in either direction, and which is positioned between said indoor coil and said ground coils, allowing for heat exchange so as to control the state and temperature of the refrigerant, and having sufficient volume capacity to accumulate liquid refrigerant to prevent liquid refrigerant from entering said compressor;
   f. a means for allowing a portion of said refrigerant traveling between said indoor coils and said outdoor coils to be diverted to an inlet side of said compressor; and
   g. a valve which controls a flow of refrigerant through said means in response to refrigerant pressure on said inlet side of said compressor.

4. A geothermal heating and air condition system as described in claim 3, further comprising a thermostatically controlled fan which cools said refrigerant as it passes through said condenser/receiver so as to control the state and temperature of said refrigerant.

* * * * *